United States Patent
Mao et al.

[11] Patent Number: 6,144,794
[45] Date of Patent: Nov. 7, 2000

[54] MOTOR DRIVEN OPTICAL FIBER VARIABLE ATTENUATOR

[75] Inventors: Zhongming Mao, Santa Clara; Naigian Han, Sunnyvale; Zhiming Ye, Mountain View, all of Calif.

[73] Assignee: Alliance Fiber Optics Products, Inc., Sunnyvale, Calif.

[21] Appl. No.: 09/174,367

[22] Filed: Oct. 15, 1998

[51] Int. Cl.[7] .................................................. G02B 6/00
[52] U.S. Cl. .......................... 385/140; 385/31; 385/36; 385/25
[58] Field of Search ............................ 385/15, 25, 36, 385/140, 31

[56] References Cited

U.S. PATENT DOCUMENTS

| | | | |
|---|---|---|---|
| 5,506,920 | 4/1996 | Suemura et al. | 385/25 |
| 5,805,759 | 9/1998 | Fukushima | 385/140 |
| 5,900,983 | 5/1999 | Ford et al. | 385/140 X |
| 5,930,441 | 7/1999 | Betts et al. | 385/140 |

*Primary Examiner*—Brian Healy
*Attorney, Agent, or Firm*—Wei Te Chung

[57] ABSTRACT

A variable attenuator comprises a motor which actuates a lead screw to move rotatably, and a nut associated with the lead screw to move linearly. A neutral density filter moves along with the linearly moving nut wherein the filter is positioned between two spaced collimators for providing linear attenuation changes of light transmitted therebetween.

11 Claims, 4 Drawing Sheets

MOTOR DRIVEN OPTICAL FIBER VARIABLE ATTENUATOR

BACKGROUND OF THE INVENTION

1. Field of The Invention

The invention relates to a variable attenuator for use in optical fiber communication and optical network technology, and particularly to a motor driven variable attenuator with a linear motion mechanism.

2. The Related Art

A fiber optic attenuator is a passive optical component for reducing optical power propagating in a fiber, and may perform fixed or variable attenuation. Optic attenuators are widely used in optical transmission systems and optical networks, and especially in optical wavelength division multiplexer (WDM) networks which are closely related to the "Project of Information Highway". A motor driven optical variable attenuator (MDOVA) is a new device used in WDM networks and is able to automatically maintain the receiving power at a certain level so that the performance of the network can be greatly improved.

Although the MDOVA is a very practical device, only one patent discloses the corresponding content. U.S. Pat. No. 5,745,634 uses a gearbox to realize linear motion and a spring is used to reduce backlash. This complicated structure can only be housed in a large device. Furthermore, the resulting linear motion is inadequate. Setting this OVA device at a certain attentuation value will not result in very good resolution. To overcome this disadvantage, an optical detector is used in the OVA module to test the real optical power. Such a device is rather complicated and dramatically increases the cost of the OVA.

In addition, the prior art does not address the oscillation phenomenon in the attenuation spectrum, wherein such oscillation is caused by interference between two optical faces of a neutral density filter. This causes problems when the OVA is used in a WDM system or network thereby limiting its application.

Therefore, an object of the invention is to provide a cost effective and functionally reliable motor driven variable attenuator having a simple structure.

SUMMARY OF THE INVENTION

According to an aspect of the present invention, a variable attenuator comprises a motor which actuates a lead screw to move rotatably, and a nut associated with the lead screw to move linearly. A neutral density filter moves along with the linearly moving nut wherein the filter is positioned between two spaced collimators for providing linear attenuation changes of light transmitted therebetween.

DETAILED DESCRIPTION OF THE PRESENTLY PREFERRED EMBODIMENT

Figure 1:
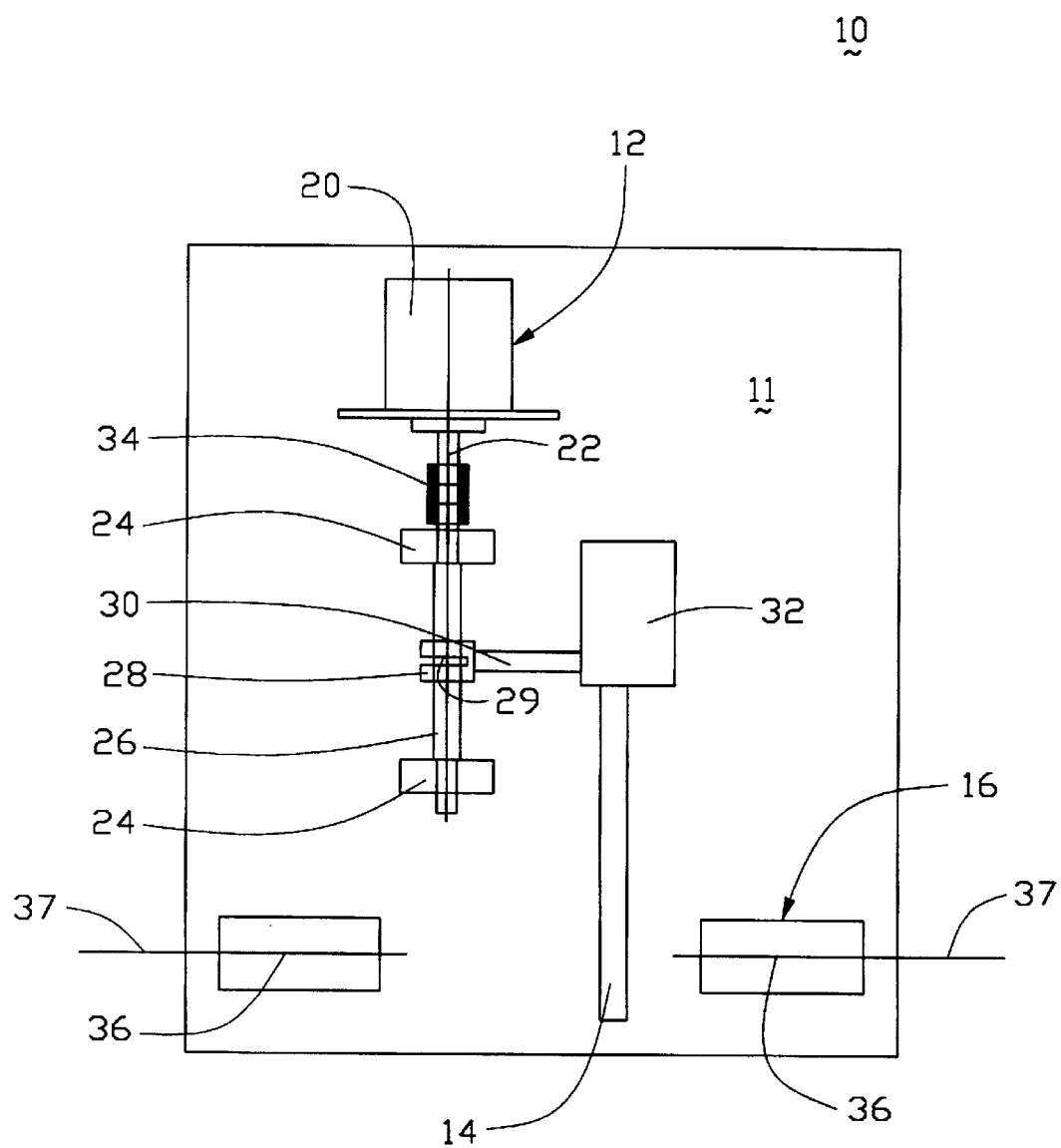
FIG. 1 is an elevational schematic diagram of a variable attenuator in accordance with the present invention.
Figure 2:
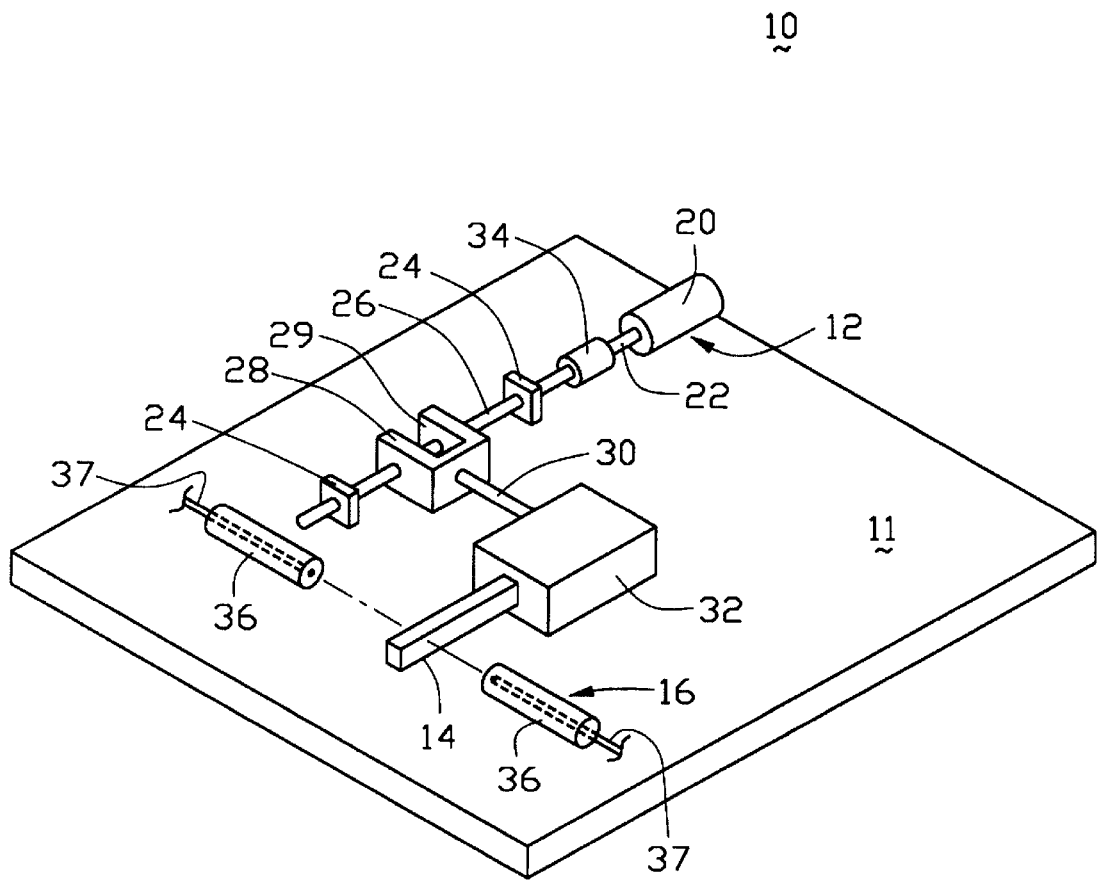
FIG. 2 is a perspective view of FIG. 1.

References will now be in detail to the preferred embodiment of the invention. Attention is directed to FIGS. 1 and 2 wherein a motor driven optical variable attenuator 10 generally includes three portions mounted on a platform 11: a linear stepping mechanism 12 for linearly providing a stable planar stepping motion, a neutral density filter 14 through the stepping motion for accomplishing linear attenuation of light penetrating therethrough, and an optical fiber coupling system 16.

The linear stepping motion mechanism 12 includes a step motor 20 with a forward extending shaft 22. A pair of spaced bearings 24 are positioned in front of the motor 20 to support a lead screw 26 forming external threads thereon. A nut 28 having internal threads is movably attached to the lead screw 26 between the bearings 24 wherein the nut 28 is also fastened to a connection pin 30 which is connected to a linear slide 32.

Two ends of the lead screw 26 extend out of the corresponding bearings 24 wherein one end is axially aligned with the shaft 22 and is substantially coupled thereto by means of a flexible coupling 34. Thus, the lead screw can be actuated to rotate with the shaft 22 of the motor 20.

The slide 32 can move linearly with regard to the platform 11. Since the neutral density filter 14 is attached to the slide 32, linear movement thereof will also result when the slide 32 is moved.

A pair of collimators 36 of the optical fiber coupling system 16 having optical fibers 37 extending therethrough, are positioned on opposite sides of the neutral density filter 14. Thus, any light passing between these collimators 36 will also pass through and be affected by the neutral density filter 14. The transverse movement of the filter 14 results in variable attenuation with regard to the light passing therethrough. The neutral density filter 14 can be made of either wedged glass or normal glass with an anti-reflective layer coated thereon. Either material can effectively eliminate oscillation in the attenuation spectrum whereby the attenuator is substantially wavelength independent.

Therefore, by means of the step type rotation of the motor 10, the lead screw 26 is actuated to rotate. Due to the interconnection between the nut 28 and the slide 32 through the connection pin 30 which restricts rotation of the nut 28, the nut 28 moves linearly along the lead screw 26. As a result, the slide 32 and the filter 14 also move along with the nut 28 thereby providing a variable attenuation effect on light transmitted between the pair of collimators 36.

There are several features and advantages of the present invention. First, the shaft 22 of the motor 20 is coupled to the lead screw 26 by means of the flexible rubber coupling 34 which is inexpensive and specifically adapted to precisely transfer a small torque generated from the motor 20 to the lead screw 26. The flexible coupling 34 also overlooks some degree of eccentricity between the shaft 22 and the lead screw 26, and overcomes a possible resistance force due to the eccentricity in comparison with conventional large coupling devices.

Secondly, the nut 28 defines a groove 29 therein whereby the nut 28 has a U-shaped structure which provides flexibility to absorb the gap between the engaged threads of the nut 28 and the lead screw 26 thereby stably and smoothly transforming the rotational movement into linear movement by eliminating backlash which is common in most conventional lead screw-nut transmissions.

Figure 6:
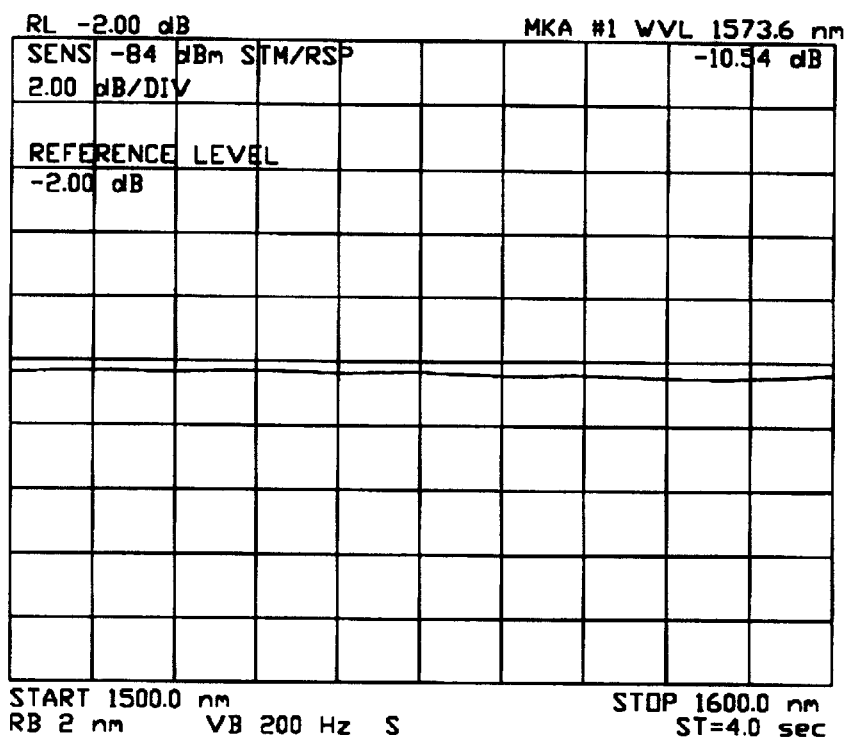
FIG. 6 is a diagram showing the attenuator spectrum resulting from the methods of the invention wherein the oscillation problem is solved.

Thirdly, the neutral destiny filter 14 can be made of wedged glass. Alternatively, one of the two opposite faces thereof may be coated with an anti-reflective material. Both of these two approaches aim to eliminate the zigzag shape of the attenuation spectrum, and the result is substantially flat as shown in FIG. 6. The linear movement of the filter 14 providing variable or linear attenuation change between a pair of collimators 36 is essentially suitable in WDM systems or networks.

Fourth, the slide 32 provides a stable linear movement of the neutral density filter 14.

In addition, the present invention does not require use of an optical detector and resolution of less than 0.1 dB can be easily achieved which is suitable for many applications.

The assembly method of the invention comprises the following 5 steps:

(1) The step motor 20 is installed on the platform 11.

(2) The lead screw 26 is screwed into the grooved nut 28 and then installed between the two bearings 24.

(3) The flexible coupling 34 is set to enclose both the shaft 22 of the motor 20 and the lead screw 26.

(4) The linear slide 32 is installed on the platform 11.

(5) The linear slide 32 and the nut 28 are interconnected by means of the connection pin 30.

(6) The two collimators 36 are spatially coupled with each other on the platform 11.

(7) The neutral destiny filter 14 is attached to the slide 32 and adapted to be moved along therewith between the two collimators 36.

As can be readily observed, assembly of the present invention is easy, the operation thereof is scientific, and the effect of the assembled product is reliable.

Figure 3:
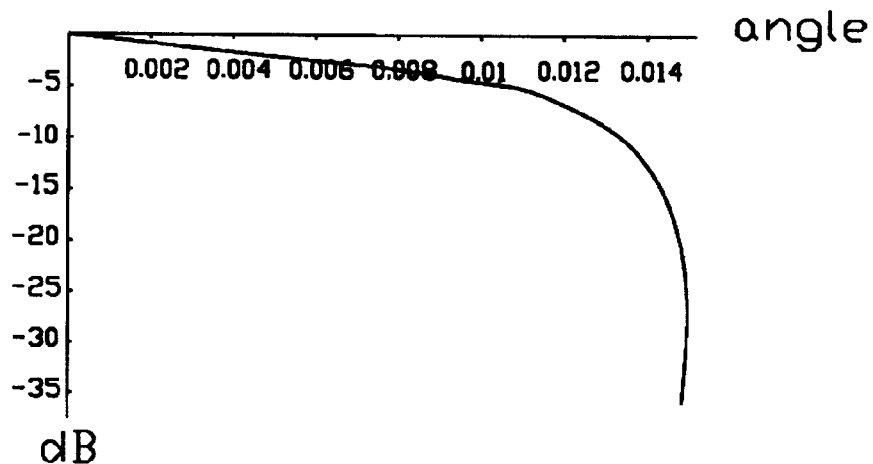
FIG. 3 is a diagram showing return loss relating to declination of the neutral density filter.
Figure 4:
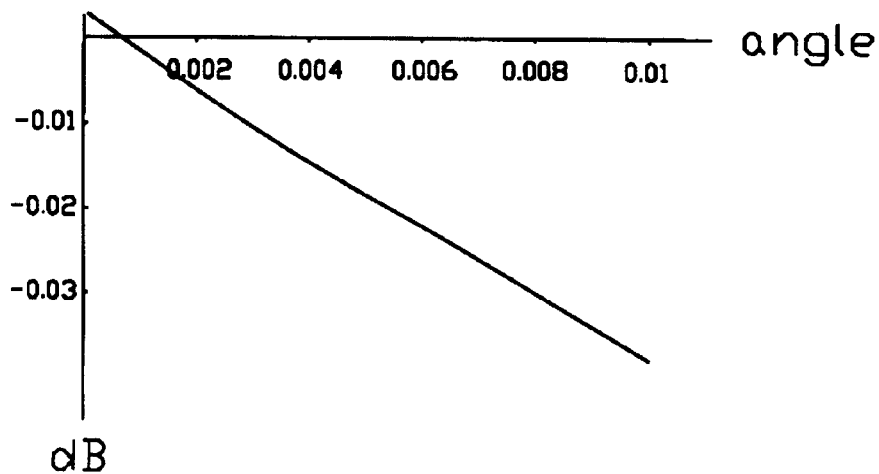
FIG. 4 is a diagram showing insertion loss relating to declination of the neutral density filter.

In this optical system, the neutral density filter 14 should be positioned at a decline for obtaining a return loss expected to be as high as 55 dB. The declination enlarges the return loss while also enlarging an insertion loss thereof. The numerical result shows that with an accurately selected position, the declination of neutral density enlarges the return loss much more than the insertion loss. If the width of the neutral density filter is 0.5 mm, the distance between the input collimator and the neutral density filter is chosen to be 10 mm. The return loss and the insertion loss changing with the declination are shown in FIGS. 3 and 4, respectively. Understandably, when the return loss reaches 55 dB the extra insertion loss can be neglected.

Figure 5:
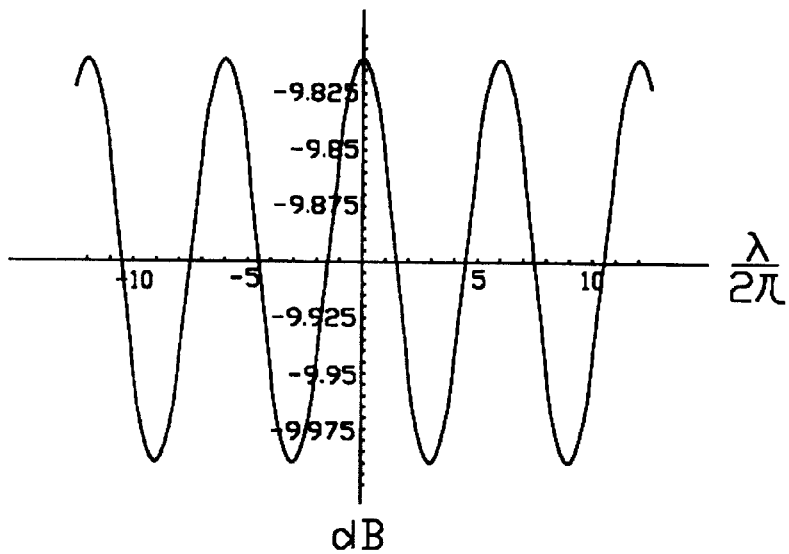
FIG. 5 is a diagram showing an oscillation phenomenon of a theoretical numerical attenuation spectrum when a common neutral density filter is used.

Addressing another issue regarding the oscillation phenomena, by using a normal glass plate for the neutral density filter, the interference from the two opposite faces of the filter will cause oscillation in the spectrum. The theoretical numerical attenuation spectrum is shown in FIG. 5, supposing the reflection rates of the two faces are 99% and 0.5%, respectively. The transverse area of the light beam is large enough and oscillation of the attenuation spectrum could be calculated. To solve this problem, the neutral density filter is made from edged glass whereby the declination improves diffraction thereby restricting resonance.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

Therefore, person of ordinary skill in this field are to understand that all such equivalent structures are to be included within the scope of the following claims.

We claim:

1. A variable attenuator comprising:

a linear stepping mechanism providing a stable linear movement thereof;

a neutral density filter adapted to be actuated to move linearly by said linear stepping mechanism; and a pair of spaced collimators positioned on opposite sides of the neutral density filter whereby light transmitted between said collimators will be attenuated by the linear movement of said density filter; wherein said linear stepping mechanism includes a lead screw cooperating with a nut for transforming a rotational movement to a linear movement.

2. The attenuator as defined in claim 1, wherein a slide is connected between the filter and the nut for providing a stable linear movement of the filter.

3. The attenuator as defined in claim 1, where said lead screw is coupled to an output shaft of the motor by means of a flexible rubber coupling.

4. The attenuator as defined in claim 1, wherein said nut has a U-shaped structure for providing resiliency thereto.

5. The attenuator as defined in claim 1, wherein said neutral density filter is made of wedged glass.

6. The attenuator as defined in claim 1, wherein said neutral density filter is formed with an anti-reflective coating.

7. A method of attenuating a light, comprising the steps of:

providing a pair of collimators spaced from each other;

providing a wedged type neutral density filter between said two collimators; and providing a linear motion mechanism to actuate the filter to move linearly; wherein said mechanism includes a transformation device essentially consisting of a lead screw actuated by a motor and a nut actuating the filter.

8. A linear motion mechanism for use with a variable attenuator, comprising:

a motor with a rotatable shaft extending therefrom;

a lead screw having external threads coupled with said shaft; and a nut having internal threads enclosing a portion of the lead screw whereby rotation of said nut is restricted;

wherein the nut can be linearly moved along the lead screw when the lead screw is actuated to rotate by the motor.

9. The mechanism as defined in claim 8, wherein a flexible rubber coupling is intermediate the lead screw and the shaft.

10. The mechanism as defined in claim 8, wherein the nut has a U-shaped structure.

11. The mechanism as defined in claim 8, wherein a slide is connected to the nut by means of a connection pin.

* * * * *